H. L. OCHS.
VEHICLE TIRE.
APPLICATION FILED NOV. 29, 1918.
1,306,769.
Patented June 17, 1919.
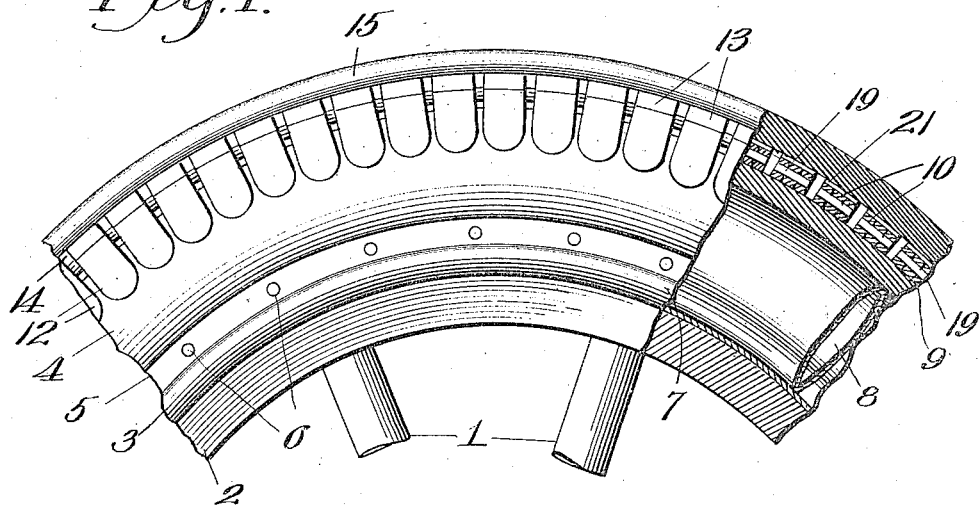
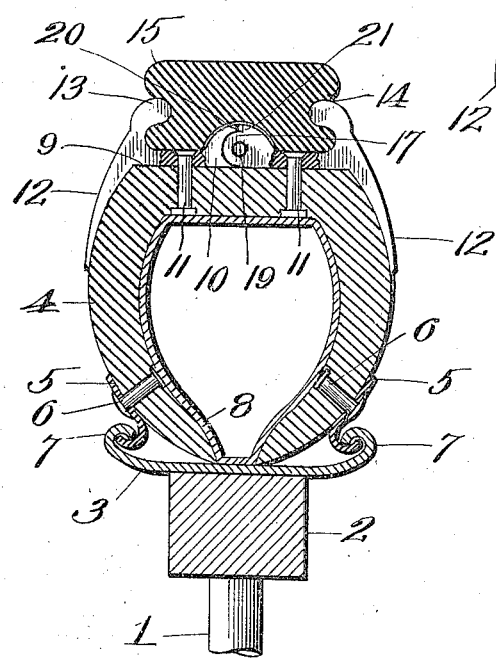
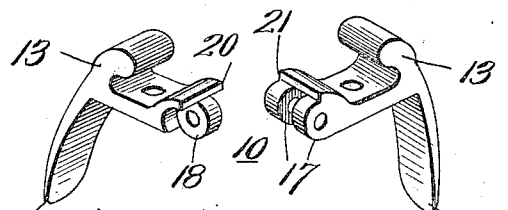
INVENTOR
Henry L. Ochs.
BY
George Thorpe
ATTORNEY

UNITED STATES PATENT OFFICE.

HENRY L. OCHS, OF KANSAS CITY, MISSOURI.

VEHICLE-TIRE.

1,306,769.  Specification of Letters Patent.  Patented June 17, 1919.

Application filed November 29, 1918. Serial No. 264,517.

*To all whom it may concern:*

Be it known that I, HENRY L. OCHS, a citizen of the United States, residing at Kansas City, in the county of Jackson and State of Missouri, have invented certain new and useful Improvements in Vehicle-Tires, of which the following is a specification.

This invention relates to vehicle tires of that class possessing cushioning and sound deadening properties, and in which the pneumatic element is proof against wear or puncture from contact with the ground, street curbing or from nails, glass or other sharp objects in the road.

The object of the invention is to produce an inflated casing provided with permanently attached protecting members arranged around the circumference of the casing and composed of elements hinged together by rule-joint hinges so as to be capable of opening like jaws when the tire is flattened by pressing its sides together, to receive a resilient tread between them, and of closing when the tire is inflated or compressed vertically as when standing on the ground, to grip or interlock with and hold the tread in place. A further object is to provide the protecting member with arcuate arms extending radially of and externally embracing the casing to protect the same against injury at its sides by contact with a street curbing or sharp objects in wheel ruts in a roadway, and to function as levers when the tire is inflated or spread laterally to intensify the gripping of the tread.

With these objects in view the invention consists in certain novel and useful features of construction and organization of parts as hereinafter described and claimed; and in order that it may be fully understood reference is to be had to the accompanying drawing, in which:

Figure 1, is a side view, partly in central vertical section, of a pneumatic tire embodying the invention.

Fig. 2, is a cross section of the same.

Fig. 3, is a perspective view of the clamping members of the device.

In the said drawing, where like reference characters identify corresponding parts in all of the figures, 1 are the usual spokes of a wheel, 2 the felly and 3 the rim thereof.

4 is a pneumatic tire casing, which may have the peculiar method of attachment to the rim as shown, consisting of metal hooks 5 riveted to the tire casing as at 6 and engaging the inturned flanges 7 of the rim, or may be of the ordinary clencher or any preferred type casing. The casing is equipped with the customary inner tube 8.

Where in the ordinary type of casing the tread would appear, to carry out my invention part of the tread is cut away as at 9 to offer a flat peripheral surface for the accommodation of the protecting equipment.

Secured to the tire casing on the flat portion above mentioned and spaced equal distances apart so as to allow for play between them under the contraction and expansion of the pneumatic tire casing due to the unevenness of the roadway, and extending completely around the casing, is a series of clamping devices 10, which I prefer to rivet to the flat portion of the tire casing as at 11, or which may be secured in any other suitable manner to prevent circumferential slippage or creeping of the tire tread on the tire casing.

The clamping devices 10 are of metal and are made in two sections, one to fit each side of the tire casing. Each section has a bowed arm 12 against which the inflated tire will exert force tending to move them outwardly and upwardly, and the deflated tire will exert pressure in the same manner, as the weight of the vehicle will tend to bow the sides of the pneumatic tire casing outwardly, and it is thus apparent that the tread will at all times be securely fastened to the casing and protect the same from wear or injury.

The upper ends of the bowed arms 12 are formed with inturned flanges 13 for fitting in the grooves 14 formed in the sides of the tread portion 15, which may be of rubber or any suitable equivalent.

The two sections of the clamping device are fastened together by means of a rule-joint 16, one section of the device having two centrally perforated ears 17 between which fits the single centrally perforated ear 18 of the other section of the device, the rivet 19 being passed through the central perforations to form a hinge on which the two sections may swing. The closing movement of the inturned flanges 13 due to the outward pressure exerted on the bowed arms 12 is limited by the contact of the shoulder 20 of one section of the device with the abutment 21 of the other.

By referring to the drawing and to the above description it will be apparent that when it is desired to remove the tread portion of the tire, it may be easily and quickly performed by deflating the tire and exerting pressure by hand on the opposite sides of the bowed arms of the clamping device. The resiliency of the pneumatic tire casing will permit the rule-joint to turn and the bowed arms of the clamping device to be pressed inwardly which will draw apart or open the inturned flanges of the upper ends of the arms and permit the tread portion to be removed. The same manipulation will be followed for the purpose of securing a new tread portion in position.

A further advantage is apparent in that the metal clamping arms will protect the sides of the pneumatic tire casing against abrasion by contact with a curbstone, and ruts or channels in the roadway.

From the above description it will be apparent that I have produced a device of the character described embodying all of the features of advantage pointed out as desirable in the statement of the object of the invention, and while I have described and claimed what now appears to be the preferred embodiment of the device it is to be understood that I reserve all right to such changes as may properly fall within the spirit and scope of the appended claims.

I claim:

1. The combination of a pneumatic tire, a plurality of clamping devices peripherally engaging the tire, each device comprising two sections pivotally fastened together, and a tread portion circumferentially surrounding the tire and secured in place by said clamping devices.

2. The combination of a pneumatic tire, a plurality of clamping devices peripherally engaging the tire, each device comprising two sections pivotally fastened together and provided with bowed arms extending radially inward and externally embracing the tire, and a tread portion circumferentially surrounding the tire and secured in place by said clamping devices.

3. The combination of a pneumatic tire, a plurality of clamping devices peripherally engaging the tire, each device comprising two sections pivotally fastened together and provided with inturned flanges, and a tread portion circumferentially surrounding the tire and engaged by said inturned flanges of the clamping devices.

4. The combination of a pneumatic tire, a plurality of clamping devices peripherally engaging the tire, each device comprising two sections pivotally fastened together and provided with bowed arms extending radially inward and externally embracing the tire and with inwardly turned flanges, and a tread portion circumferentially surrounding the tire and engaged by said inturned flanges of the clamping devices.

5. The combination of a pneumatic tire, having a flat peripheral portion, a plurality of clamping devices peripherally engaging the flat portion of the tire and secured thereto, each device comprising two sections pivotally fastened together and provided with bowed arms extending radially inward and externally embracing the tire and with inwardly turned flanges, and a tread portion circumferentially surrounding the tire and engaged by said inturned flanges of the clamping devices.

In testimony whereof I affix my signature.

HENRY L. OCHS.

Copies of this patent may be obtained for five cents each, by addressing the "Commissioner of Patents, Washington, D. C."